United States Patent [19]

De Groot

[11] Patent Number: 5,562,791
[45] Date of Patent: Oct. 8, 1996

[54] METHOD OF PRODUCING A THERMOPLASTIC SANDWICH PLATE

[76] Inventor: Martin T. De Groot, Wilhelminastraat 192II, 1054 WT Amsterdam, Netherlands

[21] Appl. No.: 99,180

[22] Filed: Jul. 29, 1993

[51] Int. Cl.⁶ .............................. B29C 65/02; B32B 5/18
[52] U.S. Cl. .................. 156/79; 156/242; 156/308.2; 156/311; 264/46.5
[58] Field of Search ................... 156/79, 242, 308.2, 156/311; 428/304.4, 317.1, 317.5, 318.4, 318.6, 319.7; 264/46.5

[56] References Cited

U.S. PATENT DOCUMENTS

| | | | |
|---|---|---|---|
| 3,903,346 | 9/1975 | DeLeon et al. | 156/79 |
| 3,915,772 | 10/1975 | Weissenfels et al. | 156/79 |
| 4,087,300 | 5/1978 | Adler | 156/312 |
| 4,451,317 | 5/1984 | Oizumi et al. | 156/307.3 |
| 4,826,723 | 5/1989 | Brambach | 428/319.7 |
| 4,913,958 | 4/1990 | Skaggs et al. | 428/318.6 |
| 5,225,450 | 7/1993 | Beukers et al. | 156/79 |
| 5,271,879 | 12/1993 | Saatchi et al. | 156/79 |
| 5,374,383 | 12/1994 | Brambach | 264/46.5 |

FOREIGN PATENT DOCUMENTS

| | | | |
|---|---|---|---|
| 3837189 | 5/1989 | Germany | 428/318.6 |
| 0013675 | 5/1978 | Japan | 156/79 |
| 1291923 | 11/1989 | Japan | 156/79 |
| 1134225 | 11/1968 | United Kingdom | 156/79 |

*Primary Examiner*—Michael W. Ball
*Assistant Examiner*—Richard Crispino
*Attorney, Agent, or Firm*—Bauer & Schaffer

[57] ABSTRACT

A method of producing a sandwich plate that consists of a foamed core layer and two fiber-reinforced cover layers, comprising the steps of providing a sheet of a thermoplastic plastics material, such as polyetherimide, containing an amount of a suitable solvent or blowing agent;

placing said sheet between two fiber-reinforced layers of a similar thermoplastic material, such as polyetherimide; placing the core web and cover layer assembly between two pressure plates;

supplying heat and pressure to the pressure plates to cause foaming of the core web and cooling the pressure plates when a predetermined foam layer thickness is obtained.

According to one aspect of the invention one of the cover layers has a remaining percentage of solvent that does not exceed 0.1% of weight.

According to a second aspect of the invention the thermoplastic material in at least one of the cover layers is a modification having a higher chemical resistance than the thermoplastic material of the core layer.

7 Claims, No Drawings

METHOD OF PRODUCING A THERMOPLASTIC SANDWICH PLATE

The invention relates to a method of producing a sandwich plate that consists of a foamed core layer and two fiber-reinforced cover layers, comprising the steps of providing a sheet of a thermoplastic plastic material, such a polyetherimide, containing an amount of a suitable solvent or blowing agent;

placing said sheet between two fiber-reinforced layers of a similar thermoplastic material, such as polyetherimide; placing the core web and cover layer assembly between two pressure plates;

supplying heat and pressure to the pressure plates to cause foaming of the core web and cooling the pressure plates when a predetermined foam layer thickness is obtained.

Examples of a thermoplastic sandwich plate consisting of a foamed core layer and two fiber=reinforced cover layers are disclosed e.g. in EP 0264495 and EP 0313171. Such sandwich plates are suitable starting material for shaping (interior) parts for aircrafts, spacecrafts and ships, as well as for rail and road vehicles. Sandwich plates of this type are relatively easily mouldable under pressure and heat (vide also EP 0269148) and result in relatively light-weight parts having excellent strength properties, which is of particular importance in the aircraft and spacecraft field, Furthermore the need for good fire resisting and fire retarding properties leads to the selection of a specific thermoplastic material, such as polyetherimide.

In the above prior art documents various methods are described for producing such sandwich plates. According to a method that is described in more detail, a completed foam core layer (such as a polyetherimide foam layer) is assembled with two completed cover layers (e.g. consisting of a polyetherimide impregnated fabric of aramide fibers), while supplying heat and pressure. To improve the bond between core and cover layers it is proposed to provide the foam core layer with shallow grooves and to apply a web of a thermoplastic material (polyetherimide), which may have been pretreated by a solvent, between the grooved foam layer and the cover layers.

As an alternative the possibility of a production in situ is mentioned EP 0313171. This alternative method, which is actually used in practice, involves a method as defined herein above. As soon as the core web and cover layer assembly has reacted a uniform temperature that is required for foaming of the plastic material, the pressure plates are permitted to space apart in accordance with a certain foaming curve that is determined by the type of plastic material, the solvent and the desired core layer thickness, until the predetermined foam layer thickness is obtained, after which the pressure plates and thereby the obtained sandwich plate is cooled.

It will be clear, that this production method if simpler and therefore more efficient as compared with the first mentioned method and that a reliable bond between core and cover layers is secured without any pretreatment such as the provision of grooves and intermediary layers.

It has been found in practice, however, that the thus produced sandwich plates generally show surface irregularities in the form of bulges and/or pits, which are variably distributed across the cover layer surface. These bulges and/or pits become manifest even with rather thin plates (e.g. 6 mm) and appear in a more pronounced manner according to the ultimate thickness and the foam density of the foam core layer and/or the plate surface being larger. It will be clear, that during foaming of the core layer under heat and pressure solvent will release therefrom and will act upon the thermoplastic material in the cover layers. This migration of solvent from core layer to cover layers is even required to obtain a reliable bond between these layers. This, however, does not yet explain the creation of the above mentioned irregularities.

It is an object of this invention to remove the above drawback of the presently used method and to provide a method for producing a sandwich plate of the type referred to above but which has a substantially smooth outer surface, without bulges and/or pits.

The present invention is based on the surprising insight that the irregularities in the surfaces of the cover layers referred to above are caused by the remaining solvent in the (preformed) cover layers, which may be as high at 0.5% by weight and is not evenly distributed across the cover layer.

According to one aspect of the invention a method of the above type is provided, wherein at least one of the cover layers has a remaining percentage of solvent that does not exceed 0.1% by weight.

By using cover layers having a remaining percentage of solvent which is substantially lower than usual, such cover layers will behave—until the end of the production process of the sandwich plate —as a rather homogeneous layer without locations of preference for the action of the solvent blowing agent that is migrating from the core layer during the process.

In accordance with another aspect of the invention there is provided a method of the type referred to above, wherein the thermoplastic material in at least one of the cover layers is a modification having a higher chemical resistance than the thermoplastic material of the core layer.

It is to be remarked, that the term "core sheet" is intented to cover also a multiple sheet, e.g. consisting of a plurality of sheets with a fiber reinforced layer therebetween.

The invention will be hereinafter further explained by means of a number of examples.

EXAMPLE 1

A 600 μ thick sheet of polyetherimide, known under the trade name Ultem 1000 standard grade of General Electric Company, to which 16–18% by weight of the volatile solvent dichloromethane is added, is placed between to about 0.5 mm thick cover layers consisting of a polyetherimide (Ultem 1000) impregnated glass fiber fabric (type: "8 harness satin weave", style 7781). During the production process of these cover layers the drying step is extended such, that the remaining percentage of solvent (N-methylpyrrolidinone) does not exceed 0.1 percentage by weight.

The core sheet and cover layer assembly is placed between two pressure plates heated at a temperature of about 190° C. The pressure plates are placed under a pressure of about 0.4 kPa/cm$^2$.

After about 20 seconds the assembly has reached a uniform temperature of about 185° C. The spacing between the pressure plates is then increased in accordance with a foaming curve adapted to the selected type of sheet, until the desired foam core layer thickness of 10 mm is obtained. This thickness is obtained after about 12 seconds.

Upon cooling, the sandwich plate obtained shows a smooth surface on both sides, without bulges and/or pits, whereas the strength of the plate is as high as that of the sandwich plates obtained by the presently applied method.

When using a core sheet of a larger thickness of e.g. 1200 µ the foaming step takes more time so that there is also more time for the solvent migrating from the core sheet during foaming to act upon the thermoplastic material of the cover layers, so that, while the further circumstances are equal, yet a certain tendency to form bulges and/or pits is observed.

EXAMPLE 2

A 1200 µ thick sheet of polyetherimide of the same type as used in Example 1 and to which 15–17% of weight of dichloromethane is added, is placed between two about 0.5 mm thick cover layers consisting of a polyetherimide (modification type Ultem D 5001) impregnated glass fiber fabric (type: "8 harness satin weave"). During the production process of said cover layers the drying step is extended such, that the remaining percentage of the solvent (N-methylpyrrolidinone) does not exceed 0.1% by weight.

The core sheet and cover layer assembly is placed between two pressure plates, which are heated to a temperature of 190° C. and are placed under a pressure of about 0.4 kPa/cm$^2$.

After about 26 seconds the assembly has reached a uniform temperature of about 185° C. The spacing between the pressure plates is then increased in accordance with a foaming curve adapted to the selected type of sheet, until the desired foam core layer thickness of 20 mm is obtained. This thickness is obtained after about 18 seconds.

Upon cooling the sandwich plate shows a smooth surface on both sides, without bulges or pits.

In this example the disadvantageous influence of the longer foaming time is compensated by the higher chemical resistance of the polyetherimide modification used in the cover layers. This means, that, although the dichloromethane migrating from the core layer during the foaming will act longer on the material of the cover layers, the effect of this action will not be larger than in example 1. It will be appreciated that a difference in chemical resistance between the thermoplastic material in the core and cover layers may also be realized by the selection of plastics having different compositions. As an example polyethersulfone may be used for the core layer, while polyetherimide (Ultem 1000 of Ultem D 5001) is used for the cover layers.

Preferably, however, the same type of thermoplastic material is used for both the core and cover layers, whereas polyetherimide is preferred from a strength view point.

EXAMPLE 3

A 300 µ thick sheet of polyetherimide, known under the trade name Ultem 1000 standard grade of General Electric Company, to which 17–19% of weight of the volatile solvent dichloromethane is added, is placed between two about 0.5 mm thick cover layers consisting of a polyetherimide modification (Ultem 5001) impregnated glass fiber fabric (type: "8 harness satin weave", style 7781). The remaining percentage solvent (N-methylpyrrolidinone) in the cover layers is about 0.5% by weight. The chemical resistance of polyetherimide 5001 is higher than that of polyetherimide 1000. During the production process of these cover layers the drying step is extended such, that the remaining percentage of solvent (N-methylpyrrolidinone) does not exceed 0.1 percentage by weight.

The core sheet and cover layer assembly is placed between two pressure plates heated at a temperature of about 190° C. The pressure plates are placed under a pressure of about 0.4 kPa/cm$^2$.

After about 17 seconds the assembly has reached a uniform temperature of about 185° C. The spacing between the pressure plates is then increased in accordance with a foaming curve adapted to the selected type of sheet, until the desired foam core layer thickness of 5 mm is obtained. This thickness is obtained after about 8 seconds.

Upon cooling, the sandwich plate obtained has a density of about 75 kg/m$^3$ and shows a smooth surface on both sides, without bulges and/or pits, whereas the strength of the plate is as high as that of the sandwich plates obtained by the presently applied method.

When using a core sheet of a larger thickness of e.g. 900 µ, that is blown to a thickness of 10 mm and results in a density of about 110 kg/m$^3$ the foaming step takes more time and the amount of dichloromethane is larger, so that the solvent migrating from the core sheet during foaming will act upon the thermoplastic material of the cover layers longer and more intensive while the further circumstances are equal, due to which a certain tendency to form bulges and/or pits is observed in spite of the increased chemical resistance of the plate material in the cover layer.

EXAMPLE 4

A 1900 µ thick sheet of polyetherimide of the same type as used in Example 1 and to which 14–16% of weight of dichloromethane is added, is placed between two about 0.5 mm thick cover layers consisting of a polyetherimide (modification type Ultem D 5001) impregnated glass fiber fabric (type: "8 harness satin weave"). During the production process of said cover layers the drying step is extended such, that the remaining percentage of the solvent (N-methylpyrrolidinone) does not exceed 0.1% by weight.

The core sheet and cover layer assembly is placed between two pressure plates, which are heated to a temperature of 190° C. and are placed under a pressure of about 0.4 kPa/cm$^2$.

After about 32 seconds the assembly has reached a uniform temperature of about 185° C. The spacing between the pressure plates is then increased in accordance with a foaming curve adapted to the selected type of sheet, until the desired foam core layer thickness of 20 mm is obtained. This thickness is obtained after about 18 seconds. The density of the foam is 110 kg/m$^3$.

Upon cooling the sandwich plate shows a smooth surface on both sides, without bulges or pits.

In this example the disadvantageous influence of the longer foaming time and of the larger amount of migrating solvent is compensated by the higher chemical resistance of the polyetherimide modification used in the cover layers. This means, that, although the dichloromethane migrating from the core layer during the foaming will act longer on the material of the cover layers, the effect of this action will not be larger than in example 3. It will be appreciated that a difference in chemical resistance between the thermoplastic material in the core and cover layers may also be realized by the selection of plastics having different compositions. As an example polyethersulfone may be used for the core layer, while polyetherimide (Ultem 1000 of Ultem D 5001) is used for the cover layers.

Preferably, however, the same type of thermoplastic material is used for both the core and cover layers, whereas polyetherimide is preferred from a strength view point.

For reinforcement purposes various other reinforcement fibers may be used instead of the glass fibers used in the above examples. In this connection reference is made to the possibilities mentioned in the above cited prior art documents.

I claim:

1. A method of producing a sandwich plate that consists of a foamed core layer and two fiber-reinforced cover layers, comprising the steps of providing a core sheet of a thermoplastic plastics material, containing an amount of a suitable solvent or blowing agent;

providing two preformed fiber-reinforced cover layers of a similar but non-foaming thermoplastic material, at least one of said cover layers having a percentage of solvent that does not exceed 0.1% by weight;

assembling said core sheet between said two cover layers and placing said assembly between two pressure plates;

applying heat and pressure to the pressure plates to cause foaming of the core sheet and effect bonding between the foamed core sheet and the cover layers by diffusion of solvent from the core sheet into the cover layers; and cooling the pressure plates when a predetermined foam thickness of said core sheet is obtained.

2. The method according to claim 1, characterized in that the thermoplastic material in at least one of the cover layers is a modification having a higher chemical resistance than the thermoplastic material of the core layer.

3. The method according to claim 1, wherein said thermoplastic material is polyetherimide.

4. The method according to claim 1, wherein the pressure plates are preheated to about 190° C. and the assembly of core and cover layers are heated by said pressure plates to a uniform temperature of about 185° C.

5. The method according to claim 1, wherein the cover layers are polyetherimide.

6. The method according to claim 1, wherein said pressure on said pressure plate is maintained at a pressure of about 0.4 kPa/sq. cm.

7. The method according to claim 1, wherein said core thermoplastic material is selected from the group consisting of polyetherimide, and polyethersulfone.

* * * * *